UNITED STATES PATENT OFFICE.

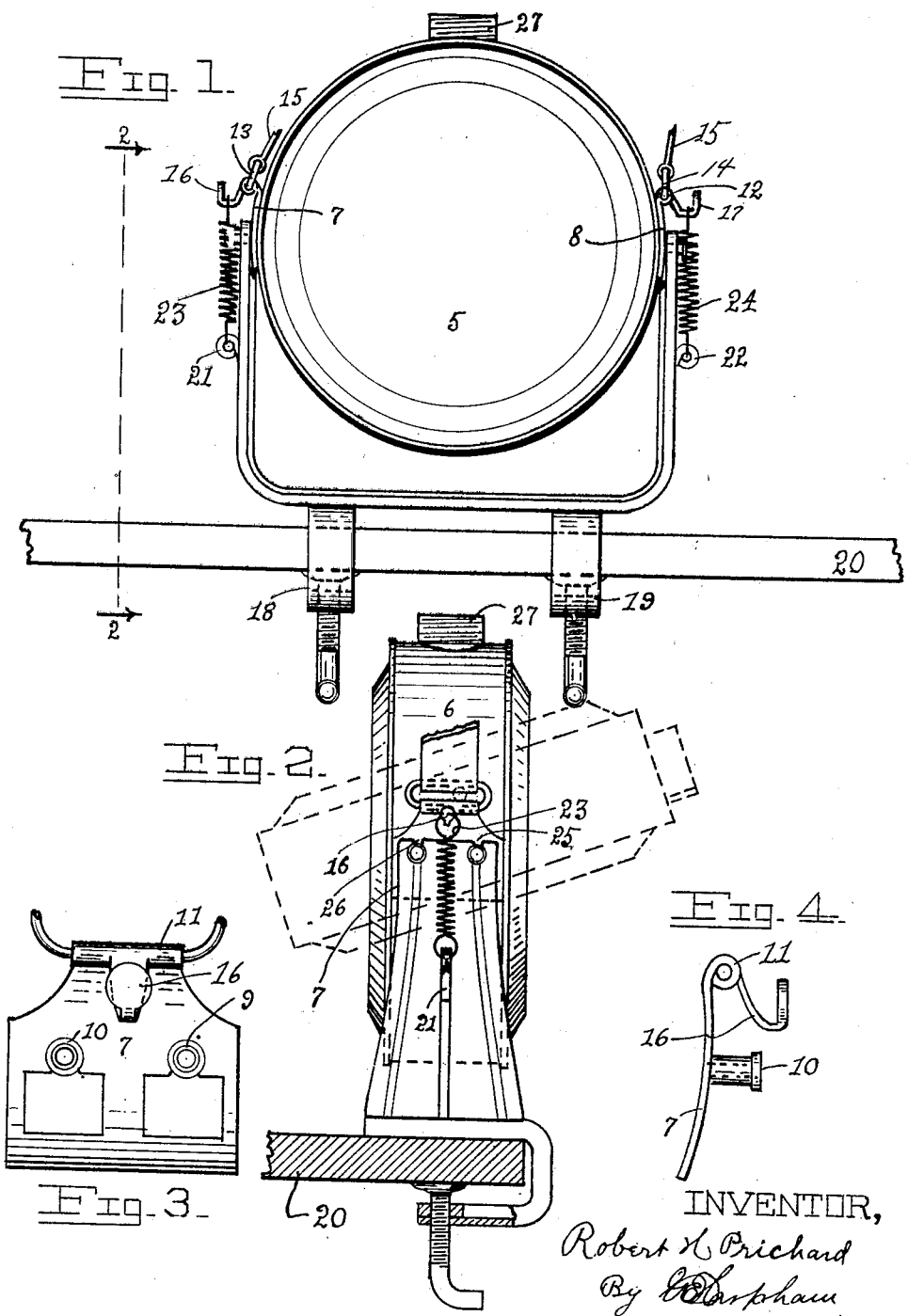

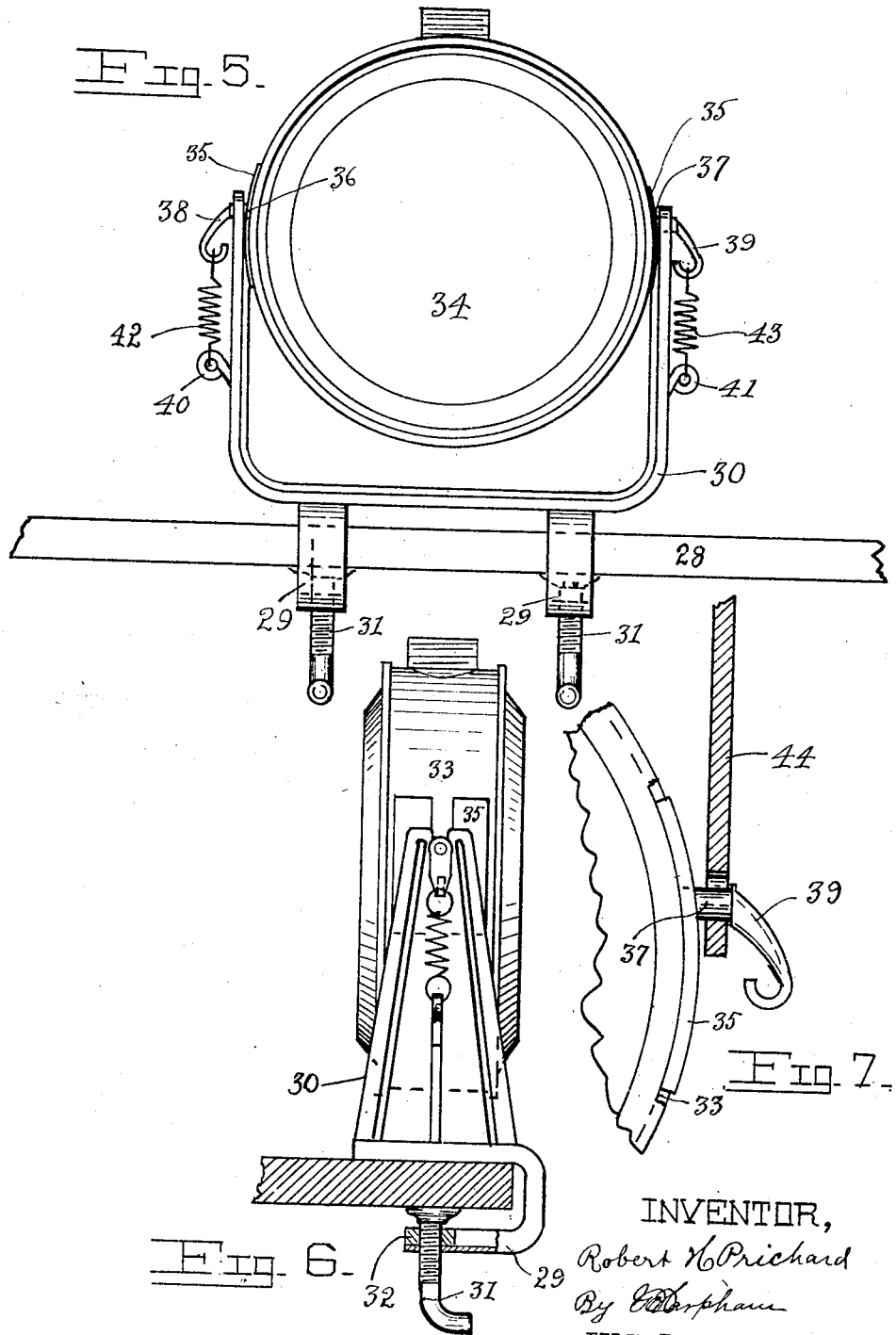

ROBERT H. PRICHARD, OF LOS ANGELES, CALIFORNIA.

CANTEEN.

1,371,436.    Specification of Letters Patent.    Patented Mar. 15, 1921.

Application filed March 3, 1919. Serial No. 280,503.

*To all whom it may concern:*

Be it known that I, ROBERT H. PRICHARD, a citizen of the United States, residing at the city of Los Angeles, county of Los Angeles, State of California, have invented new and useful Improvements in Canteens, of which the following is a specification.

My invention relates primarily to a canteen for use when traveling in an automobile, and the object thereof is to provide a canteen that can be detachably mounted on the running-board of the machine and which is so constructed that portions of its contents can be quickly and easily drawn therefrom and the canteen quickly restored to a safe carrying position. My improved canteen is adapted for use in other positions and I do not restrict myself to its use on an automobile.

In the drawings forming a part of this application Figure 1 is a side elevation of my improved canteen positioned on a fragment of the running-board of an automobile, the other parts of the machine being omitted for clearness of illustration. Fig. 2 is an edge view with the running-board cut on the line 2—2, Fig. 1, and a portion of the clamp in section. Figs. 3 and 4 are enlarged details of the swinging joint. Figs. 5, 6 and 7 show a modified form of canteen and support in which a single trunnion is used. Fig. 5 is a side elevation and Fig. 6 an edge view of this form. Fig. 7 is an enlarged fragment showing the canteen detached and supported by a strap.

Referring to the drawings 5 is the side of the body or tank of the canteen and 6 is the edge, which parts are of usual construction. Upon the opposite sides of the edge I secure by any appropriate means sheet metal plates 7 and 8. In Fig. 3 I have shown one of these plates detached, and as both plates are alike only one will be described. From the bottom portion I partially sever two portions and form them into trunnions 9 and 10. The sides near the top are bent to form eyes 11 and 12 in which are mounted the strap rings 13 and 14. In these rings are received straps 15 by means of which the canteen may be carried when detached. Beyond these eyes the top portions are bent to form hooks 16 and 17.

A supporting frame preferably U-shaped has secured thereto brackets 18 and 19 by means of which the frame may be secured to the running-board 20 of an automobile or to any other support. From the upright portions of the frame are partially severed portions 21 and 22 which are formed into eyes for holding the bottom ends of retractile springs 23 and 24 which springs, when the tank is positioned in the frame, have their upper ends passed over hooks 16 and 17, thereby securely holding the tank in the frame. In the upper ends of the side members of the frame are notches, two of which, 25 and 26 are shown in Fig. 2, in which notches are received the trunnions of plates 7 and 8 when the tank is positioned in the frame. In the top of the tank is a filling port which is covered by screw cap 27.

Referring to Figs. 5, 6 and 7, 28 is the running board of an automobile, the other parts of which are omitted for clearness of illustration. 29 is the body of the clamp secured from the bottom of a U-shaped frame 30 in which the canteen is suspended when on an automobile; screw 31 and nut 32 form parts of my clamp. To the edges 33 of the body 34 of the canteen are secured by soldering or otherwise plates of sheet metal 35, the central top portions of which are formed into trunnions 36 and 37 and hooks 38 and 39, one on each edge of the canteen, with the trunnions above and the hooks below the center of the body. In the upright members of frame 30 are struck out portions which form eyes 40 and 41 in which springs 42 and 43 are secured. The other ends of these springs are passed into hooks 38 and 39 when the parts are assembled for use on an automobile. Should it be desired to use the canteen detached from the support a strap 44 with eyes in each end may be passed over the hooks and onto the trunnions as shown in Fig. 7.

From this description it will be seen that I have provided a canteen that can be quickly attached to or detached from the running-board of an automobile or other support and that the tank is securely held in the frame at all times and can be turned to discharge the whole or any part of its contents. It will also be noted that the tank can be detached from its support and used as an ordinary canteen. When the canteen is used on a non-moving body the springs can be omitted and the brackets could also be dispensed with.

Having described my invention I claim:

1. A canteen provided with a pair of trunnions on each of the edges thereof; a support having notches in which such trunnions are received; and retractile springs having the ends secured to the support and to the canteen whereby the canteen is held yieldingly in its support.

2. A canteen comprising a tank whose edges are substantially circular; plates secured to the opposite edges of said tank, portions of said plates being formed into trunnions whose ends terminate in hooks; in combination with a U-shaped support having notches in the top thereof in which the trunnions are received, portions of said support being formed into eyes; springs secured to said eyes and to the hooks on the trunnions; and brackets secured to said support.

In witness that I claim the foregoing I have hereunto subscribed my name this 21st day of February, 1919.

ROBERT H. PRICHARD.